United States Patent
Koma

(10) Patent No.: US 6,563,558 B2
(45) Date of Patent: *May 13, 2003

(54) LIQUID CRYSTAL DISPLAY WITH LIGHT SHIELDING FILM

(75) Inventor: Norio Koma, Gifu (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,225

(22) Filed: Nov. 17, 1998

(65) Prior Publication Data

US 2001/0048494 A1 Dec. 6, 2001

(30) Foreign Application Priority Data

Nov. 18, 1997 (JP) ............................................. 9-317171

(51) Int. Cl.[7] ...................... G02F 1/1333; G02F 1/1337
(52) U.S. Cl. ...................................... 349/110; 349/130
(58) Field of Search ................................ 349/110, 130, 349/123, 138

(56) References Cited

U.S. PATENT DOCUMENTS

| | | | |
|---|---|---|---|
| 5,051,570 A | 9/1991 | Tsujikawa et al. | 250/201.1 |
| 5,084,905 A | 1/1992 | Sasaki et al. | 257/776 |
| 5,307,189 A | 4/1994 | Nishiki et al. | |
| 5,309,264 A | 5/1994 | Lien et al. | |
| 5,327,001 A * | 7/1994 | Wakai et al. | 257/350 |
| 5,585,951 A | 12/1996 | Noda et al. | 349/122 |
| 5,612,799 A | 3/1997 | Yamazaki et al. | 349/42 |
| 5,618,592 A | 4/1997 | Nagae et al. | 349/123 |
| 5,629,786 A | 5/1997 | Ogura et al. | 349/123 |
| 5,666,179 A | 9/1997 | Koma | |
| 5,706,064 A | 1/1998 | Fukunaga et al. | 349/43 |
| 5,708,485 A | 1/1998 | Sato et al. | |
| 5,719,647 A | 2/1998 | Fujikawa et al. | |
| 5,726,721 A | 3/1998 | Sumiyoshi et al. | |
| 5,757,452 A * | 5/1998 | Masaki et al. | 349/110 |
| 5,757,455 A | 5/1998 | Sugiyama et al. | |
| 5,760,861 A | 6/1998 | Kim | |
| 5,767,827 A | 6/1998 | Kobayashi et al. | 345/87 |
| 5,784,132 A | 7/1998 | Hashimoto | 349/124 |
| 5,831,704 A | 11/1998 | Yamada et al. | |
| 5,835,177 A * | 11/1998 | Dohjo et al. | 349/147 |
| 5,844,538 A | 12/1998 | Shiraki et al. | |
| 5,870,157 A | 2/1999 | Shimada et al. | |
| 5,877,832 A | 3/1999 | Shimada et al. | |
| 5,917,562 A * | 6/1999 | Woodgate et al. | 349/96 |
| 5,956,105 A | 9/1999 | Yamazaki et al. | 349/43 |
| 5,990,491 A | 11/1999 | Zhang | 257/57 |
| 6,040,885 A * | 3/2000 | Koike et al. | 349/130 |
| 6,057,896 A * | 5/2000 | Rho et al. | 349/42 |

FOREIGN PATENT DOCUMENTS

| | | | |
|---|---|---|---|
| JP | 61141174 | 6/1986 | H01L/27/14 |
| JP | 1156725 | 6/1989 | G02F/1/133 |
| JP | 2234134 | 9/1990 | G02F/1/136 |
| JP | 08-122768 | 5/1996 | |

* cited by examiner

Primary Examiner—Robert H. Kim
Assistant Examiner—Dung Nguyen
(74) Attorney, Agent, or Firm—Hogan & Hartson, LLP

(57) ABSTRACT

A pixel electrode for driving liquid crystal is formed on a planarization insulator film covering a thin film transistor, and a vertical alignment film is formed on the pixel electrode without rubbing treatment. A direction control window that is electrode-free portion is formed in a common electrode, and a vertical alignment film is formed on the common electrode without rubbing treatment. The liquid crystal having negative dielectric constant anisotropy is controlled in an initial alignment of the substantially normal direction without pretilt. Upon applying a voltage, the tilt of the alignment is controlled in the direction of a slanting electric field at the edge of the pixel electrode and the edge of the direction control window so that a pixel division can be performed. A black matrix between pixels is eliminated and a light shielding film is formed only in the region corresponding to the thin film transistors so that light leakage is prevented.

15 Claims, 17 Drawing Sheets

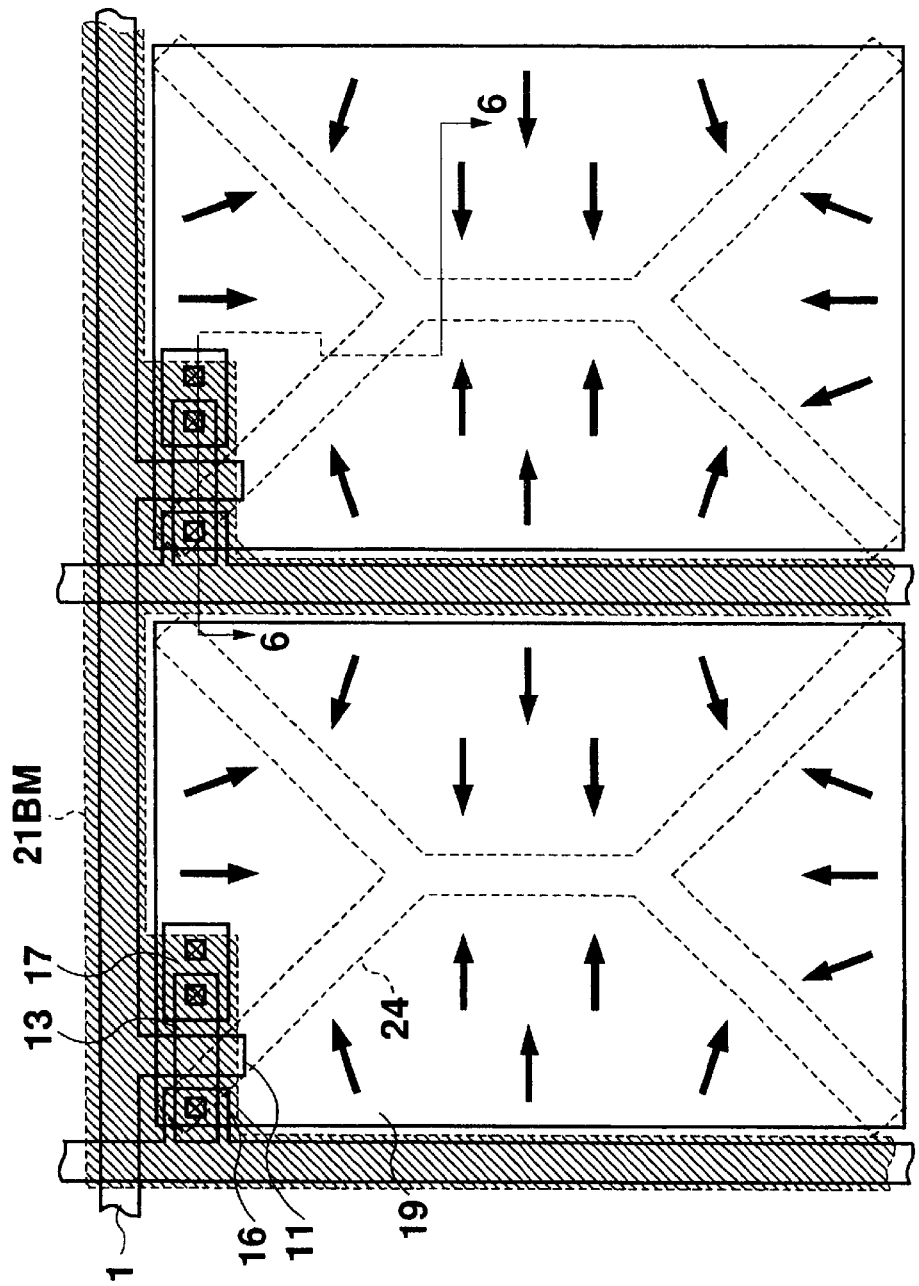

LIQUID CRYSTAL DISPLAY WITH LIGHT SHIELDING FILM

BACKGROUND OF THE INVENTION

1. Field of the Invention

The present invention relates to a liquid crystal display (LCD), particularly to an LCD having thin film transistors for driving each pixel.

2. Description of the Related Art

Flat panel displays such as LCDs, organic electroluminescence (EL), or plasma displays have been enthusiastically developed and commercialized in recent years. Particularly, LCDs have become the most popular display for office automation (OA) devices and audio visual (AV) devices, because LCDs have attractive features such as thin and low power consumption. Especially, active matrix LCDs employing thin film transistors (TFTs) as switching elements for controlling a timing to rewrite pixel data into each pixel enable a wide screen and animation display with a high resolution, and they are now widely used in television sets, personal computers, mobile computers, and monitors of digital still and video cameras.

A TFT is a kind of field effect transistor (FET) made of metal and semiconductor layers formed in a predetermined pattern on an insulated substrate. In an active matrix LCD, each TFT is connected to a corresponding capacitor for driving the liquid crystal disposed between a pair of substrates; the capacitor is constructed between the substrates.

FIG. 1 is an enlarged plan view of a display pixel portion of an LCD, and FIG. 2 is a cross section of the LCD along B—B line shown in FIG. 1. On the substrate 50 a gate electrode 51 is formed that is made of Cr, Ti, Ta, or another suitable metal, over which a gate insulating film 52 is formed. On the gate insulating film 52 an amorphous silicon, i.e., a-Si film 53 is formed in an island shape so as to cross over the gate electrode 51. On the a-Si film 53 an N$^+$ a-Si film 53N is formed, each end of which is doped with impurities so as to make an ohmic layer. Above the channel region of the a-Si film 53, an etch stopper 54 is remained. On the N$^+$ a-Si film 53N a drain electrode 56 and a source electrode 57 are formed, over which an interlayer insulating film 58 is formed. On the interlayer insulating film 58 a pixel electrode 59 made of indium tin oxide (ITO) or Al is formed, and is connected to the source electrode 57 via a contact hole formed in the interlayer insulating film 58. On the pixel electrode 59, an alignment film 71 made of polyimide or the like is formed, and is processed by rubbing treatment as shown in FIG. 3. In this way, the TFT substrate is manufactured.

On another substrate 60 facing the TFT substrate 50, red (R), green (G), and blue (B) color filters 61 are formed, each of which is made of a film resist and is disposed at a position corresponding to each pixel electrode 59. In addition, a black matrix 61BM which is made of a light shielding film resist is formed between the color filters 61 without clearance at a position corresponding to a gap between the pixel electrodes 59 and at a position corresponding to the TFT. On the layers of these color filters 61 a common electrode 62 made of ITO is formed. On the common electrode 62 an alignment film 72 is formed in the same way as on the substrate 50 side and is processed by rubbing treatment as shown in FIG. 4. In this way, the opposing substrate is manufactured.

Between the TFT substrate 50 and the opposing substrate 60, a liquid crystal layer 80 is disposed. The orientation, i.e., the alignment of the liquid crystal molecules 81, is controlled in accordance with an intensity of an electric field formed by a voltage applied between the pixel electrodes 59 and the common electrode 62. Outsides of the substrates 50 and 60 polarizing films (not shown) with perpendicular polarizing axes are provided. Linear polarized light passing through these polarizing films is modulated when passing through the liquid crystal layer 80 that is controlled in different alignment per each display pixel, and is thereby controlled in a desired transmittance.

In the above-mentioned example, the liquid crystal has a negative dielectric constant anisotropy. The alignment films 71 and 72 are vertical alignment films that control the initial alignment of the liquid crystal in the direction perpendicular to the substrate. In this case, when a voltage is not applied, the linear polarized light that passed through one of the polarizing films is blocked by the other polarizing films after passing through the liquid crystal layer 80 so that the display is recognized as black. When the voltage is applied, the linear polarized light that passed through one of the polarizing films is double refracted by the liquid crystal layer 80 to become an elliptically polarized light, which passes the other polarizing films so that the display is recognized as nearly white. This type is called a normally black (NB) mode. Particularly, the vertical alignment films 71 and 72 are processed by the rubbing treatment, so that the initial orientations of the liquid crystal molecules 81 are aligned in the direction with a slight pretilt from the normal direction. This pretilt angle θ is normally set to more than one degree, but equal to or less than five degrees. The liquid crystal molecule 81 is electrically uniaxial. The angle between the axial direction and the direction of the electric field is determined by the electric field strength, while the azimuth with respect to the direction of the electric field is not controlled. The liquid crystal molecule 81 having the negative dielectric constant anisotropy tilts in a direction different from the electric field direction. However, by providing pretilt, an applied voltage can make the liquid crystal molecule 81 tilt toward the pretilt direction. Thus, giving the pretilt angle and controlling the tilt direction of the liquid crystal molecule 81 to be aligned, a variation of alignments of the liquid crystal in a plane can be suppressed and deterioration of the display quality can be prevented.

The black matrix 61BM is provided for preventing light passing due to a birefringence of the liquid crystal with the pretilt in a region in which the voltage is not applied between the display pixels.

The liquid crystal having a negative dielectric constant anisotropy changes the alignment of its molecules upon the electric field, in such a way that the alignment becomes perpendicular to the direction of the electric field. On this occasion, the liquid crystal generates an action opposing the generated electric field. However, in general, such a change of the alignment from the vertical alignment of the liquid crystal is not stable compared with the case a liquid crystal having a positive dielectric constant anisotropy such as a twist nematic (TN) liquid crystal changes from the horizontal alignment. Especially, unevenness of the alignment film 71 and 72 at the interface with the liquid crystal due to a step of the TFT or the color filter layer influences the alignment change of the liquid crystal, resulting in a deteriorated display quality.

Furthermore, as shown in FIGS. 3 and 4, the related art uses rubbing treatment of the vertical alignment film 71 and 72 in order to give the pretilt θ to the initial alignment of the liquid crystal as shown in FIG. 2. Therefore, when a voltage is applied, all the liquid crystal molecules 81 tilt in the direction of the pretilt (rightward in FIG. 2). Accordingly, the tilt angle of the liquid crystal molecule 81 with respect to the optical path when viewing the LCD from upper right in FIG. 2 is different from that when viewing the LCD from upper left, resulting in different transmittances. Thus, there is a problem that a brightness or a contrast ratio changes in accordance with a viewing direction. This is known as viewing angle dependence.

Furthermore, since the black matrix 61BM formed on the opposing substrate 60 side should completely cover the gap region between the pixel electrodes, it is formed larger to allow for possible position shift when the black matrix 61BM is affixed to the TFT substrate 50 side. For this reason, effective display area decreases, and aperture ratio decreases.

In addition, the rubbing treatment for making the vertical alignment film 71 of the TFT substrate side may cause an electrostatic breakdown of the TFT, which results in defective display or decline of yield in production of LCDs.

SUMMARY OF THE INVENTION

An object of the present invention is to solve the above-mentioned problems. The liquid crystal display according to the present invention has first and second substrates facing each other, the outer surface of the first and/or second substrate being provided with a polarizing film, and the liquid crystal disposed between the first and second substrates for modulating light that passed through the polarizing film so as to perform display. The liquid crystal display further includes a plurality of thin film transistors disposed in a matrix on the surface of the first substrate facing the second substrate and electrode wires thereof, an insulating film having a flattened surface and covering the thin film transistors and the electrode wires thereof, a pixel electrode for driving the liquid crystal that is formed on the insulating film and is connected to the thin film transistor via a opening formed in the insulating film, a vertical alignment film formed on the pixel electrodes, a common electrode for driving the liquid crystal formed on the surface of the second substrate facing the first substrate, a direction control window that is electrode-free portion formed in the area of the common electrode facing the pixel electrode, a light shielding film facing only the thin film transistors, and a vertical alignment film formed on the common electrode. The liquid crystal has negative dielectric constant anisotropy, and initial alignment of the liquid crystal is within one degree from the normal direction of the substrates.

In another aspect of the present invention, a liquid crystal display has first and second substrates facing each other, the outer surface of the first and/or second substrate being provided with a polarizing film, and the liquid crystal disposed between the first and second substrates for modulating light that passed through the polarizing film so as to perform display. The liquid crystal display further includes a plurality of thin film transistors disposed in a matrix on the surface of the first substrate facing the second substrate and electrode wires thereof, an insulating film having a flattened surface and covering the thin film transistors and the electrode wires thereof, a pixel electrode for driving the liquid crystal that is formed on the insulating film and is connected to the thin film transistor via a opening formed in the insulating film, a vertical alignment film formed on the pixel electrodes, a common electrode for driving the liquid crystal formed on the surface of the second substrate facing the first substrate, a direction control window that is electrode-free portion formed in the area of the common electrode facing the pixel electrode, a light shielding film facing a gap region between the pixel electrodes and is smaller than the gap between the pixel electrodes, and a vertical alignment film formed on the common electrode. The liquid crystal has negative dielectric constant anisotropy, and initial alignment of the liquid crystal is within one degree from the normal direction of the substrates.

As described above, since the region where the thin film transistor is formed is shielded from light, a leakage current is prevented from flowing through the transistor. In addition, the other region does not need to form a light shielding film. Even if the light shielding film is formed, it is not required to be a large film considering a possible position shift in affixing two substrates to each other. Thus, an aperture ratio of each pixel can be improved.

Furthermore, in the present invention, tilt in the alignment of the liquid crystal can be controlled in the region of the slanting electric field generated at the edge portion of the picture electrode and in the no electric field region, so that the pixel division is performed properly and the viewing angle dependence is reduced.

In another aspect of the present invention, the vertical alignment film is not processed by rubbing treatment. Therefore, the initial alignment of the liquid crystal is controlled within one degree from the normal direction of the substrates, and the alignment control of the liquid crystal is performed properly without any disturbance at the edge portion of the pixel electrode and in the direction control window.

In another aspect of the present invention, the second substrate is transparent in at least the region corresponding to the pixel electrode and the region corresponding to the gap between the pixel electrodes, and at least a part of the region corresponding to the gap between the pixel electrodes is shielded from light by the liquid crystal and the polarizing film.

Thus, the light shielding film is not required to be larger than the gap between the pixel electrodes considering the possible position shift in affixing the first and second substrates to each other, so that the effective display area is increased and the aperture ration also increases.

In another aspect of the present invention, the insulating film has a thickness equal to or more than one micrometer.

Thus, the alignment control action of the liquid crystal at the edge portion of the pixel electrode and in the direction control window is not disturbed by the influence of the electric field in the thin film transistor and its electrode wire, so that pixel division can be properly performed.

As explained above, in the present invention, the light shielding film can be eliminated or at least can be minimized, so that the aperture ratio of each pixel can be improved and a bright display can be attained. In addition, the pixel division is performed properly by the electric field control so that the viewing angle dependence is reduced and the display quality is improved. Furthermore, since the rubbing process is eliminated, the production cost is reduced and electrostatic generation is prevented, so that the yield in production is improved.

BRIEF DESCRIPTION OF THE DRAWINGS

FIG. 10 is a plan view of a liquid crystal display in accordance with a second embodiment of the present invention.

DESCRIPTION OF THE PREFERRED EMBODIMENTS

Figure 5:
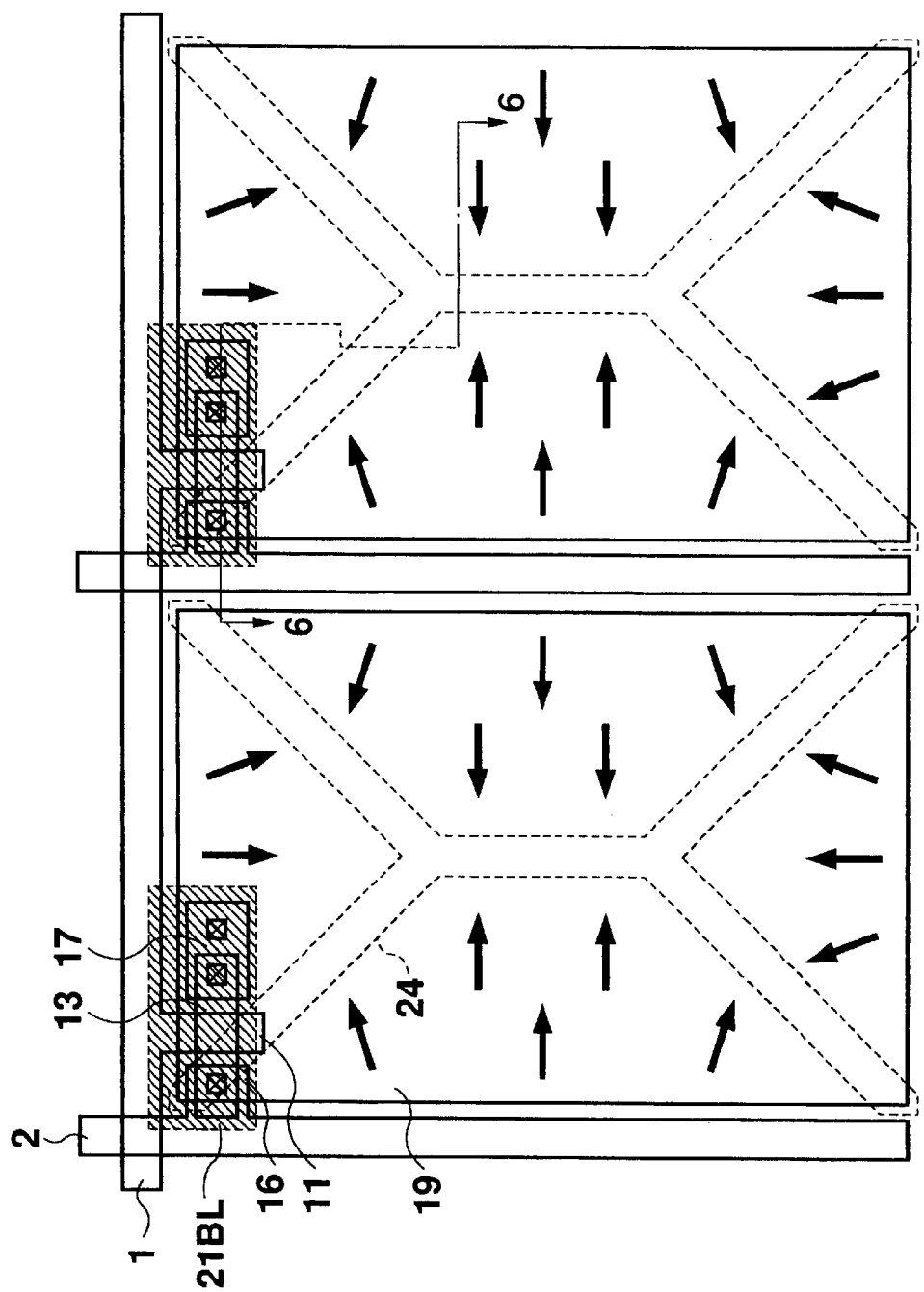
FIG. 5 is a plan view of a liquid crystal display in accordance with a first embodiment of the present invention.
Figure 6:
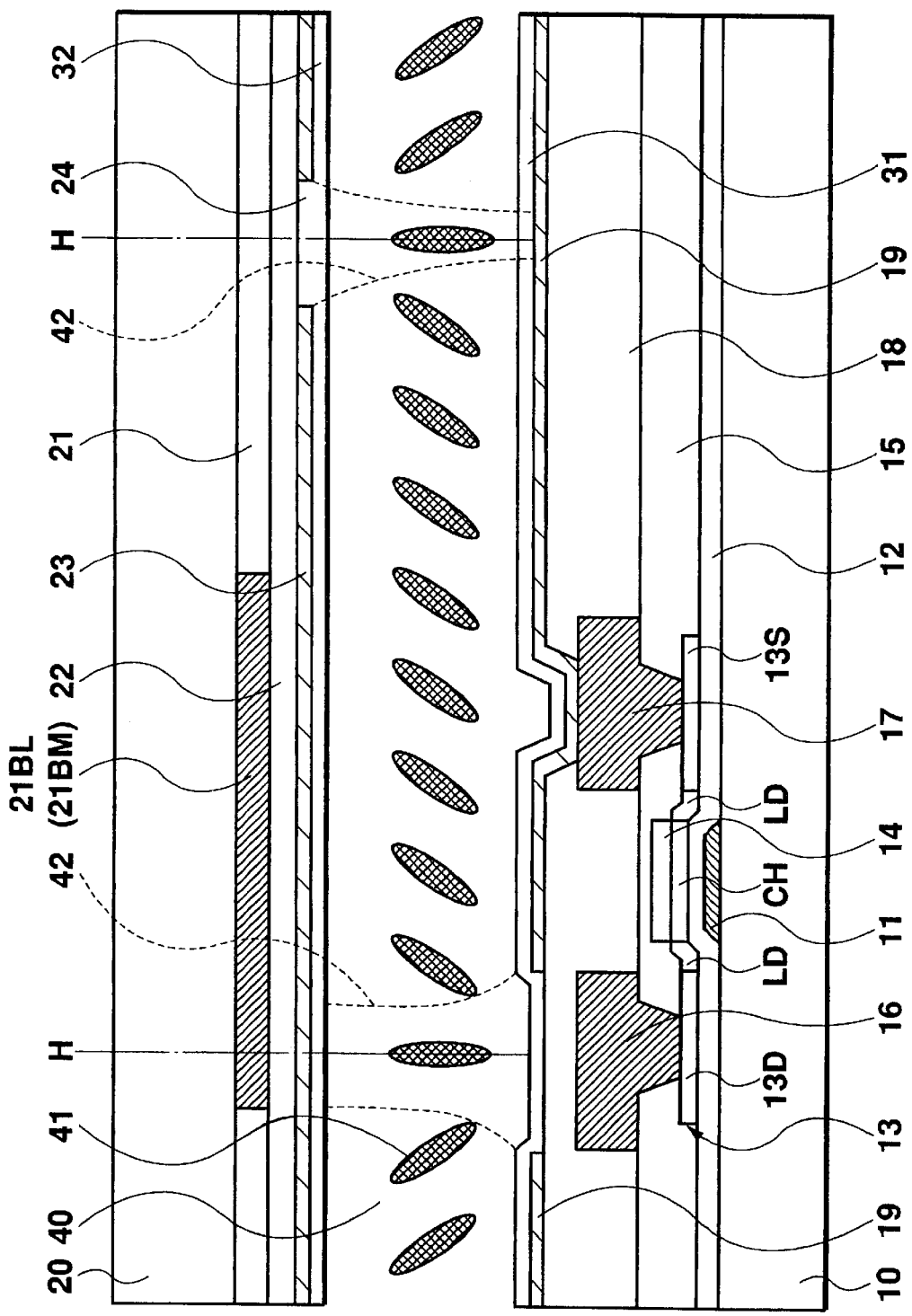
FIG. 6 is a cross section along 6—6 line of the liquid crystal display shown in FIGS. 5 and 10.

FIG. 5 is a plan view of a display pixel portion of the LCD in accordance with a first embodiment of the present invention, and FIG. 6 is a cross section along 6—6 line shown in FIG. 5. On a substrate 10, a gate electrode 11 made of Cr, Ti, Ta, or another suitable metal is formed, and over this a gate insulating film 12 is formed. On the gate insulating film 12 a P-Si film 13 is formed in an island shape so as to cross over the gate electrode 11. The p-Si film 13 has a non-doped channel region CH directly above the gate electrode 11, lightly doped regions LD in which a N type impurity such as phosphor at low concentration at both sides of the channel region CH, a source region 13S and a drain region 13D in which the same impurity is doped at high concentration at outer sides of the lightly doped regions LD, so as to form an LDD structure.

On the channel region CH, a doping stopper 14 used as a mask in ion doping process is remained. Over the p-Si film 13 an interlayer insulating film 15 is formed, on which a drain electrode 16 and a source electrode 17 are formed, which are connected to the drain region 13D and the source region 13S of the p-Si film 13 via contact holes formed in the interlayer insulating film 15. Covering the drain electrode 16 and the source electrode 17, a planarization insulator film 18 made of SOG, BPSG, or acrylic resin is formed, on which pixel electrodes 19 made of indium tin oxide (ITO) or Al are formed and are connected to the source electrode 17 via contact holes formed in the planarization insulator film 18. On the pixel electrodes 19 a vertical alignment film 31 made of polyimide or the like is formed.

Facing the TFT substrate 10, an opposing substrate 20 is disposed, and a liquid crystal layer 40 is disposed between the TFT substrate 10 and the opposing substrate 20. On the substrate 20, red (R), green (G), and blue (B) color filters 21 are formed, each of which is made of a film resist and is disposed at a position corresponding to each pixel electrode 19. In addition, a light shielding film 21BL made of non-transparent film resist is formed at the region corresponding to the TFT and is positioned between the color filters 21. On the color filters 21 and the light shielding film 21BL, a protection film 22 such as a planarization insulator film made of acrylic resin is formed. In addition, a common electrode 23 made of ITO is formed on the protection film 22. In the common electrode 23, a direction control window 24 is formed by eliminating the ITO. As shown in FIG. 5, the direction control window 24 extends linearly in the middle of the pixel and branches at each end in two directions, each of which bends by 45 degrees toward a corresponding corner of the pixel. On the common electrode 23 and this window 24, a vertical alignment film 32 is disposed in the same way as in the substrate 10 side.

In the present invention, the planarization insulator film 18 of the TFT substrate side and the planarization insulator film 22 of the opposing substrate side have a function for enhancing flatness of the surface as a foundation film of the pixel electrode 19 and the common electrode 23. Especially, when a liquid crystal having a negative dielectric constant anisotropy changes from the vertical alignment, good alignment change is promoted as a relative action with the electric field, i.e., an action opposing the electric field is generated. In a high resolution LCD, the roughness of the TFT or the color filter layer 31 becomes relatively large. Therefore, by reducing such steps, the flatness of the interface between the alignment films 31, 32 and the liquid crystal layer 40 is enhanced, which in turn improves uniformity of the alignment and display quality.

Furthermore, since the vertical alignment films 31 and 32 are not processed by rubbing treatment, the pretilt angle is set within one degree, and preferably at zero degree as shown in FIG. 6. In other words, the alignment vector indicating an average alignment within an area agrees the normal direction, or the angle therebetween is equal to or less than one degree, in the initial state. Therefore, in the voltage-applied state too, the liquid crystal molecules 41 are directed in the normal direction or within one degree from the normal direction between the display pixels.

In the above-mentioned structure, when voltage is applied, an electric field 42 is generated between the pixel electrode 19 and the common electrode 23, causing the liquid crystal molecules to tilt. At the edge portion of the pixel electrode 19, the electric field 42 is slanting from the edge of pixel electrode 19 toward the common electrode 23. Accordingly, the liquid crystal molecules 41 change their alignment so as to form the shortest slanting path from the electric field 42. In other words, not depending on the directivity given by the pretilt as in the related art, the slanting electric field tilts the alignment toward the inner side of the pixel electrode 19. As shown in FIG. 5, the alignment tilts from each of four sides of a pixel electrode 19 toward the middle of the pixel electrode 19.

Since the common electrode 23 does not exist in the direction control window 24, an electric field is not generated, even when a voltage is applied between the pixel electrode 19 and the common electrode 23. The liquid crystal molecules 41 are fixed to the initial alignment in the area of the direction control window 24. Though the alignment controlled by the four sides of the pixel electrode 19 influences the middle portion of the pixel electrode 19 because of the continuity of the liquid crystal, the boundary between the areas in which the alignment of the liquid crystal are different is fixed on the direction control window 24. In other words, as shown in FIG. 5, the alignment of the liquid crystal molecules are directed in four different directions in each minute area within the display pixel defined by the direction control window 24, i.e., so-called pixel division is performed. Therefore, in each display pixel, minute areas having different transmittances are averaged so that a constant brightness can be obtained for all viewing angles. Thus, the problem of the viewing angle dependence is solved and a wide viewing angle display can be obtained.

Since the planarization insulator film 18 is used for a foundation film of the pixel electrode 19 in the present invention, the initial alignment of the liquid crystal is controlled within one degree from the normal direction in high uniformity. In addition, the planarization insulator film 18 has a thickness of approximately one micrometer, so that the liquid crystal cannot be influenced easily by the electric field of the TFT and electrode wires (lines) 1, 2, 16, and 17 thereof disposed under the planarization insulator film 18. Therefore, as mentioned above, the pixel division is performed in the excellent condition by the combination action of the slanting electric field 42 at the edge portions of the pixel electrode 19 and no electric field at the direction control window 24.

If the width of the direction control window 24 is increased sufficiently, a slanting electric field 42 is also generated at the edge portion of the direction control window 24, as shown in FIG. 6. In this case, if the direction control window 24 has a shape as shown in FIG. 5, the tilt direction of the liquid crystal molecule 41 at the edge portion of the pixel electrode 19 and the tilt direction of the liquid crystal molecule 41 at the edge portion of the direction control window 24 are identical or at least different by no more than 45 degrees, in any area defined by a side of the pixel electrode 19 and the direction control window 24. Accordingly, the alignment control action at the edge portion of the pixel electrode 19 is substantially the same as that at the edge portion of the direction control window 24, so that the control performance can be improved. In other words, in each minute area of the display pixel defined by the direction control window 24 the orientation is controlled by the edge portion of the pixel electrode 19 as well as by the edge portion of the direction control window 24 similarly, so that the orientation is aligned with high uniformity.

Figure 1:
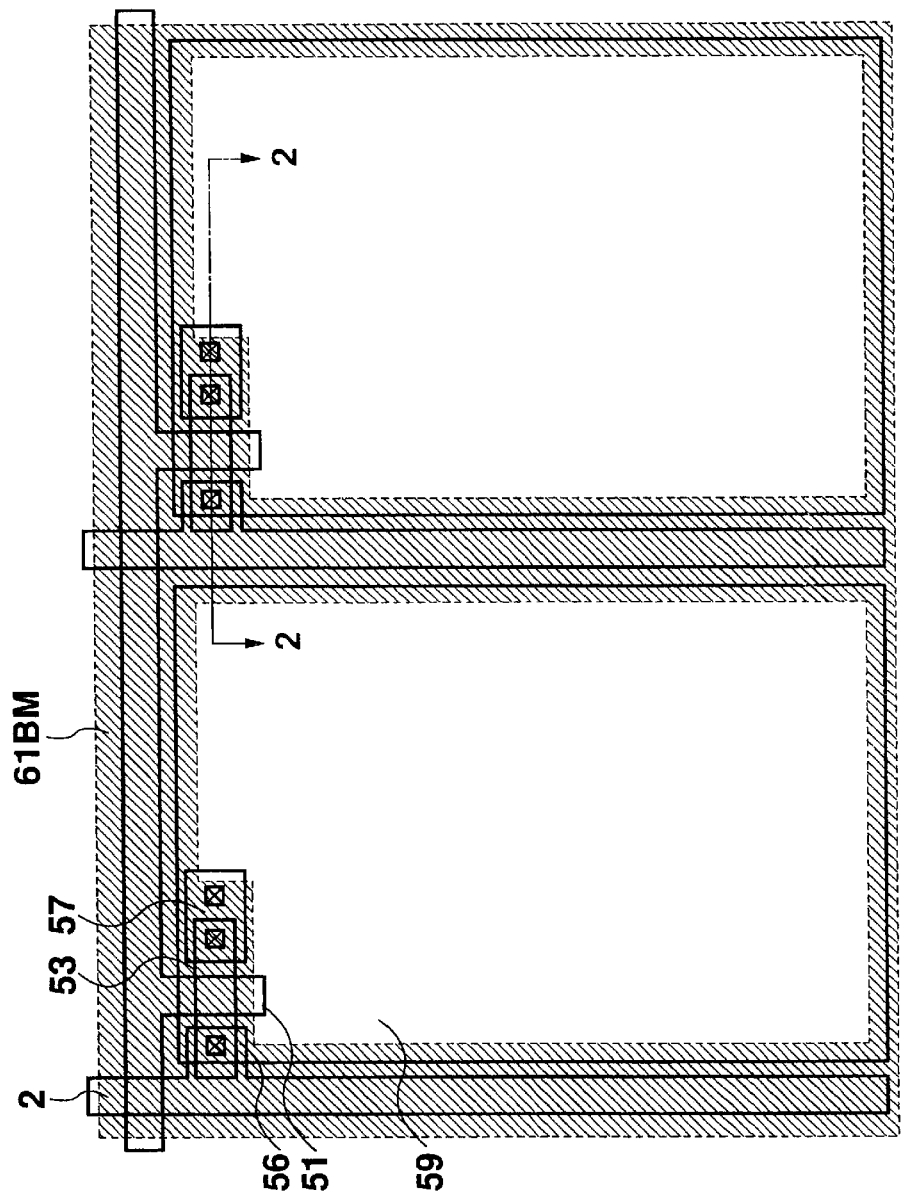
FIG. 1 is a plan view of a liquid crystal display in accordance with the related art.
Figure 2:
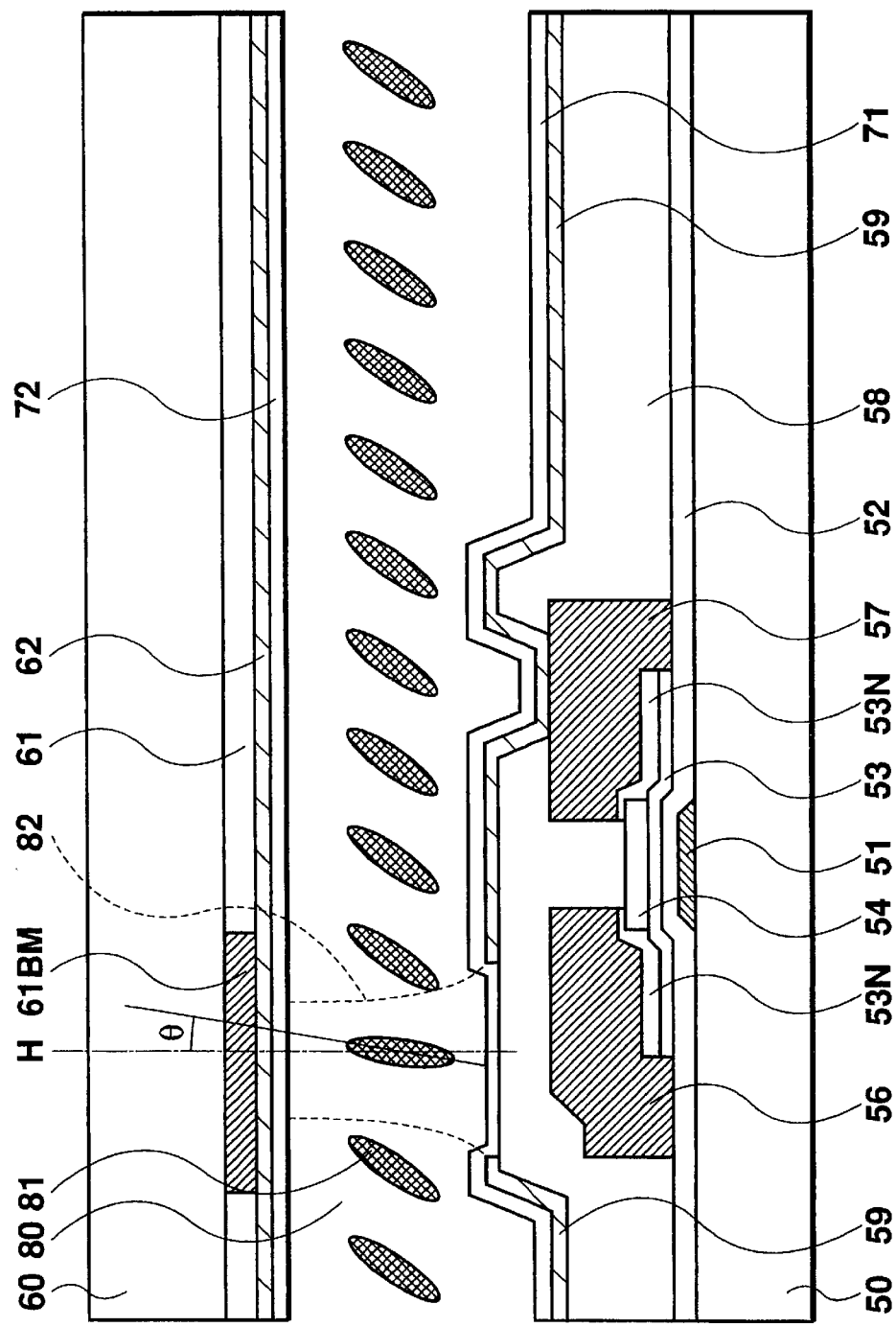
FIG. 2 is a cross section along 2—2 line of the liquid crystal display shown in FIG. 1.
Figure 3:
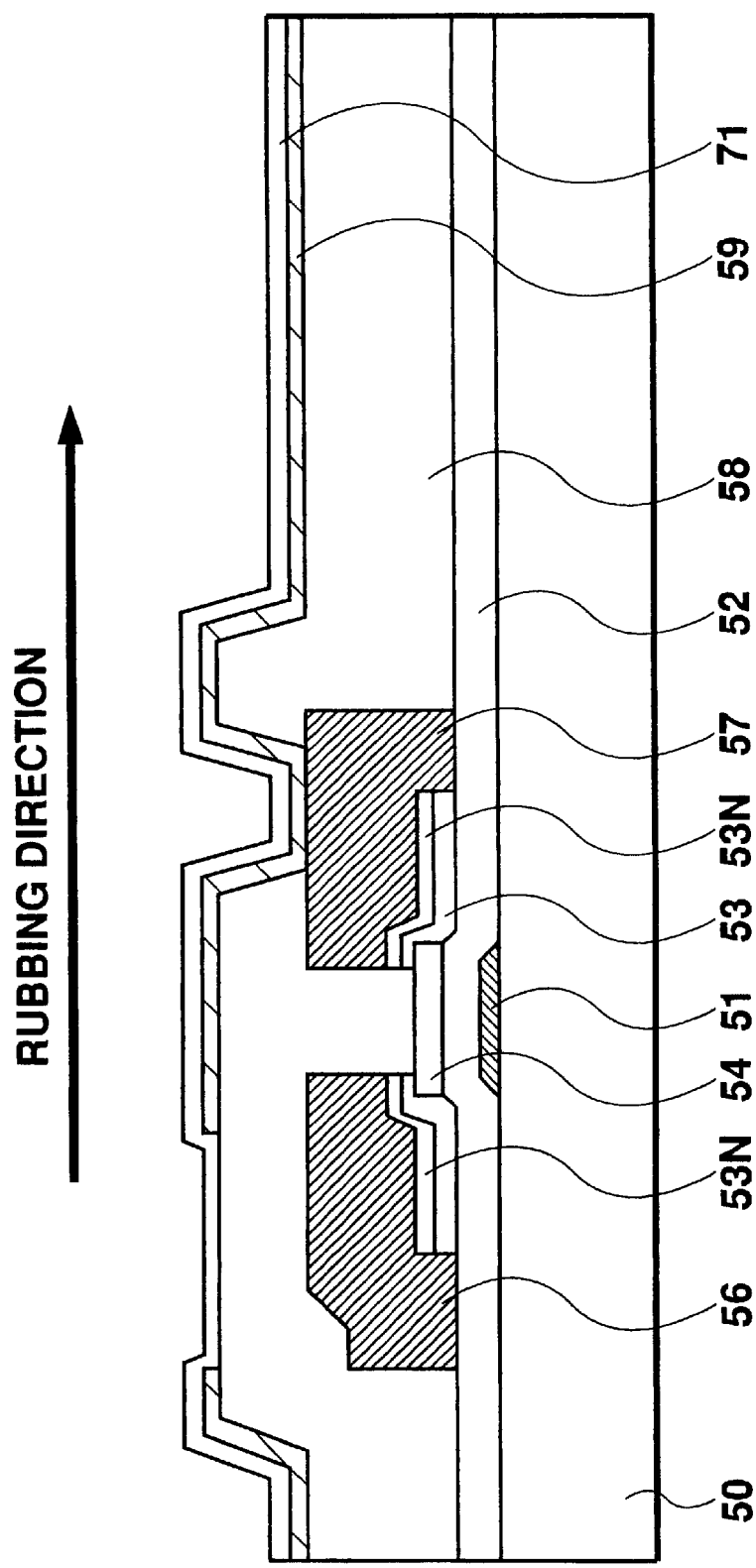
FIGS. 3 and 4 are cross sections showing manufacturing step of the liquid crystal display in accordance with the related art.
Figure 4:
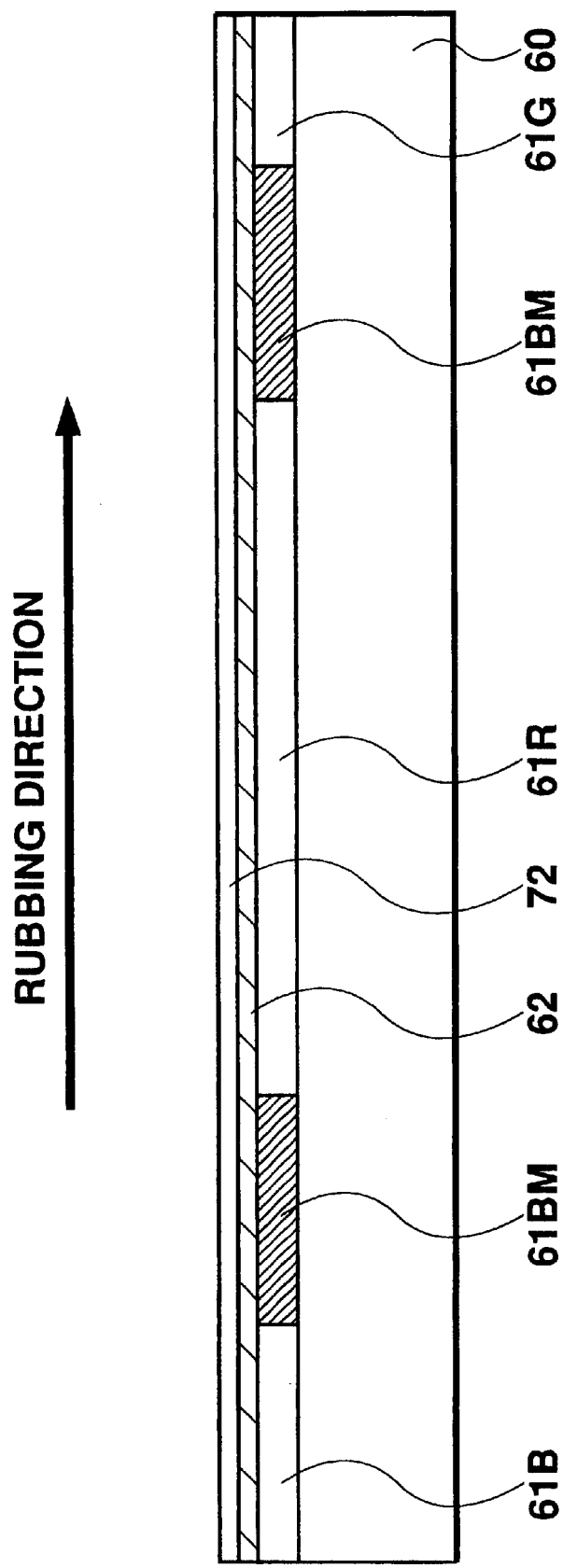

On the other hand, the opposing substrate 20 does not have the black matrix 61BM covering the entire gap between the pixels as shown in FIGS. 1 and 2. This is possible because the initial alignment of the liquid crystal molecule 41 is within one degree from the normal direction in the present invention, so that light leak in the area between the pixel electrodes 19 due to the pretilt given to the liquid crystal is suppressed and the light is completely blocked without the black matrix. However, in the present invention, the light shielding film 21BL is provided covering only TFT region to suppress a leak current due to light entering the TFT region. Therefore, it is not necessary to make the black matrix on the opposing substrate 20 side larger in consideration of possible position shift in affixing, and, as a result, the effective display area is not decreased, i.e., the aperture ratio does not decrease.

The TFT described above uses polysilicon (p-Si) instead of amorphous silicon (a-Si) that is now typically used. This p-Si TFT has a large ON-current characteristic, so that the TFT dimensions can be reduced. Thus, the aperture ratio is improved and a high resolution can be performed. In addition, the p-Si TFT has a fast operation speed, and a peripheral circuit (driver) can be integrally formed on the substrate together with the display portions, so that an LCD with a built-in driver can be manufactured. The peripheral driver portion is made of CMOS consisting of N-channel and P channel TFTs having the same structure as shown in FIG. 6, though P-channel TFT does not exist in the LD region.

Figure 7:
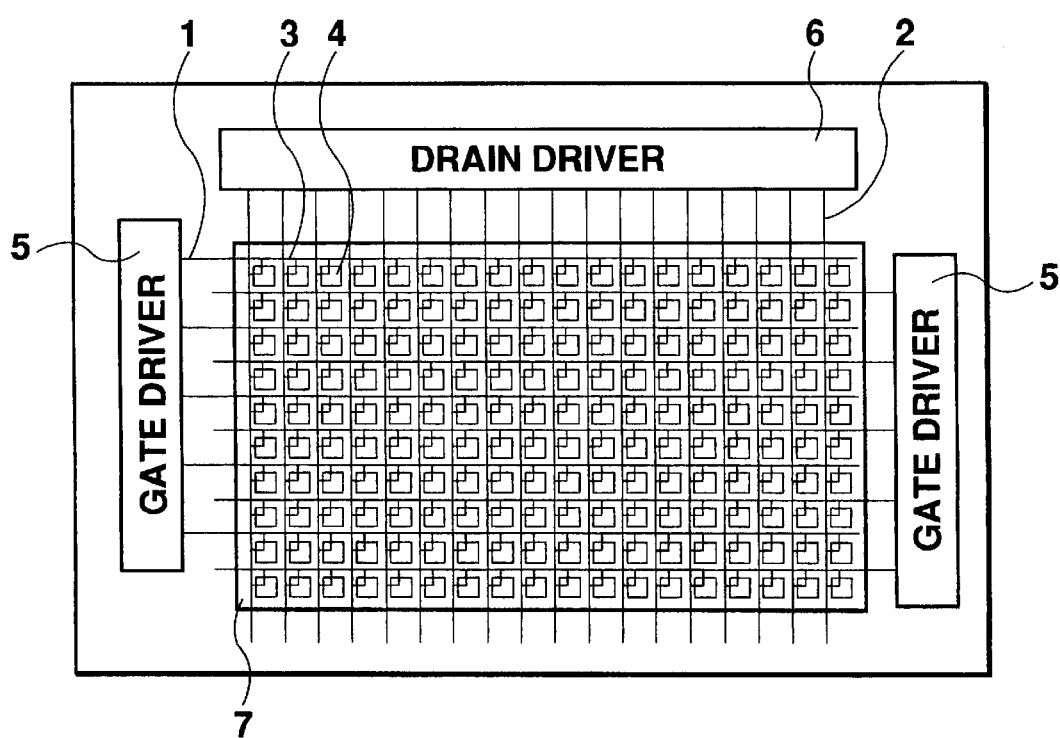
FIG. 7 is a plan view showing a general structure of a liquid crystal display.

FIG. 7 shows an LCD with a built-in driver. In the middle portion gate lines 1 connected to gate electrodes 11 and drain lines 2 connected to the drain electrodes 16 cross each other; each cross section is provided with a TFT 3 and a pixel electrode 4 connected to the TFT 3 so as to form a display portion. On the periphery of the display portion, gate drivers 5 for supplying scanning signals to the gate lines 1 and a drain driver 6 for supplying pixel signals to the drain lines 2 are formed. The display portions, the gate drivers 5, and the drain drivers 6 are formed on a same substrate. In addition, another substrate facing the substrate via liquid crystal is provided with a common electrode 7. The common electrode 7 and the liquid crystal are defined by the pixel electrodes 4 so as to form display pixels.

FIGS. 8A–8I show a process for making the TFT substrate of the LCD in accordance with the embodiment of the present invention. First, in the step shown in FIG. 8A, a Cr film is formed on a substrate 10 by sputtering, which is etched to form a gate electrode 11.

Figure 8A:
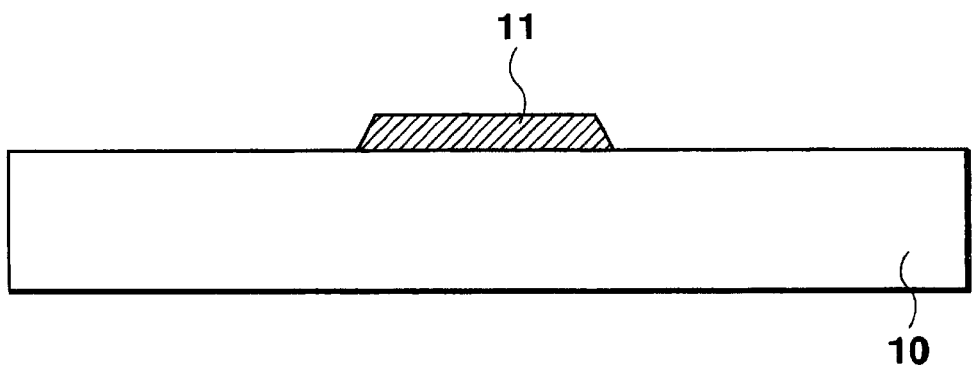
FIGS. 8A, 8B, 8C, 8D, 8E, 8F, 8G, 8H, and 8I are cross sections showing manufacturing steps of the liquid crystal display in accordance with the embodiment of the present invention.
Figure 8B:
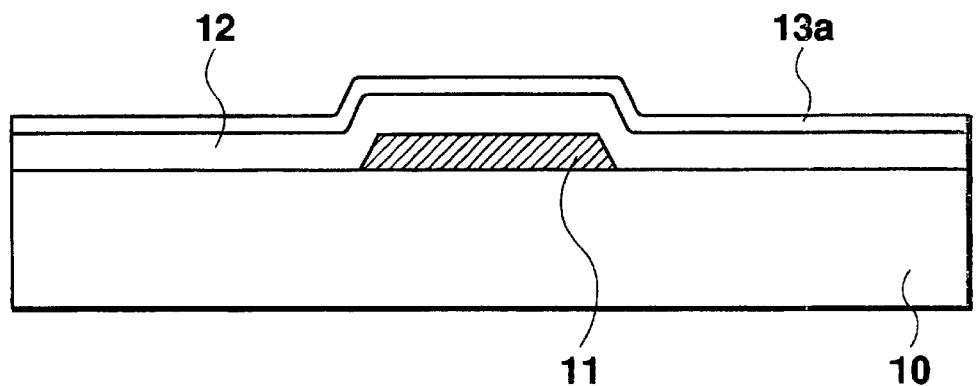

In the step shown in FIG. 8B, a gate insulating film 12 consisting of $SiN_x$ and $SiO_2$ is formed by plasma CVD so as to cover the entire surface including the gate electrode 11. Then, an amorphous silicon (a-Si) film 13a is formed in succession by plasma CVD. The a-Si film 13a is formed by decomposing and depositing mono-silane $SiH_4$ or disilane $Si_2H_4$ that are material gasses with a temperature heat of approximately 400° C., and plasma.

Figure 8C:
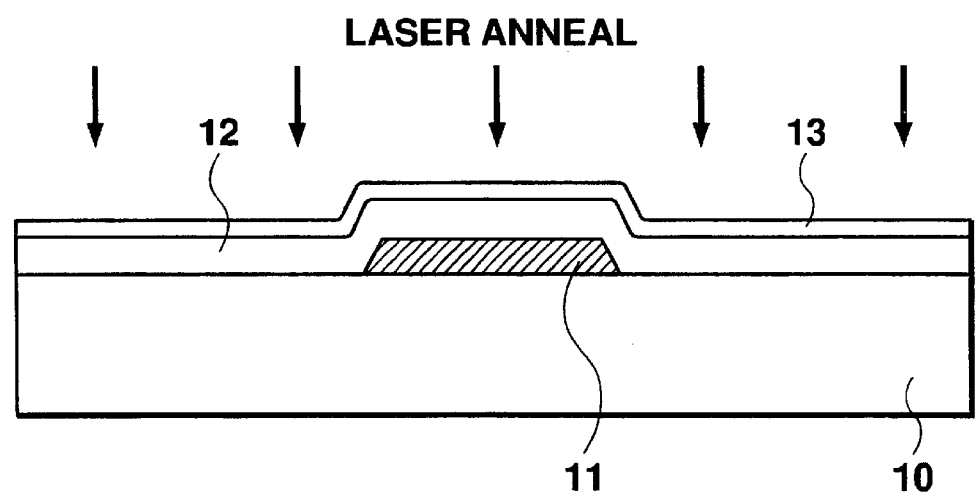

In the step shown in FIG. 8C, the a-Si film 13a is crystallized by laser annealing to form a p-Si film 13. The laser annealing is performed by line beam scanning of a pulse laser beam, for example. Since the laser annealing can be performed in relatively low temperature of the substrate below 600° C., a relatively cheap non-alkaline glass can be used for the substrate 10, so that a low cost process can be attained.

Figure 8D:
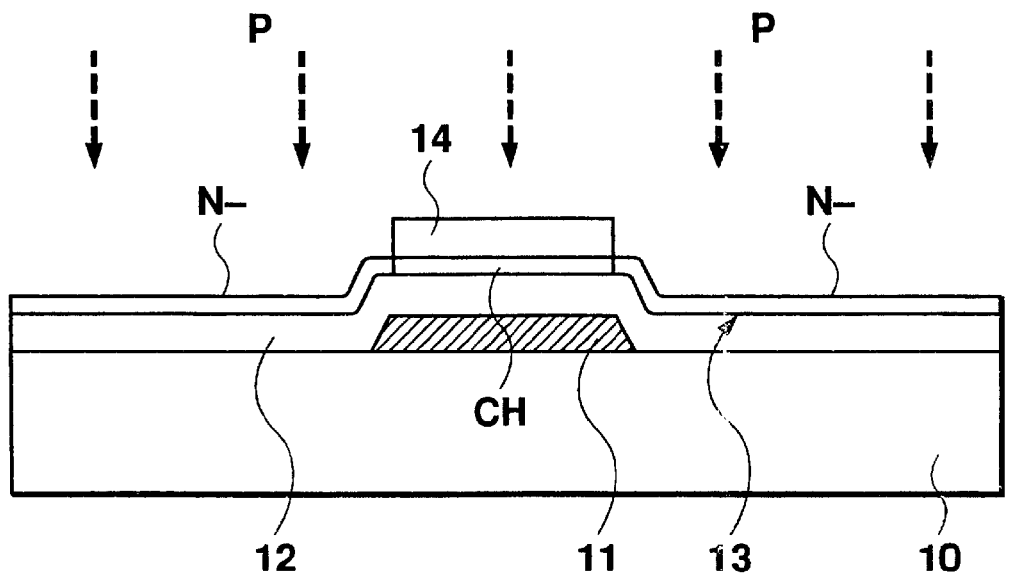

In the step shown in FIG. 8D, a $SiO_2$ film is formed on the p-Si film 13, and the $SiO_2$ film is etched by back surface exposing so that a doping stopper 14 is formed above the gate electrode 11. In the back surface exposing step, a resist is applied to the $SiO_2$ film, and the resist is exposed from below of the substrate 10 utilizing the contour of the gate electrode 11, followed by developing. This doping stopper 14 is used as a mask for ion doping of phosphor (P) that indicates N-type conductivity into the p-Si film 13 at low dose extent of approximately $10^{13}$ so that the region except the doping stopper 14 forming region is doped at low concentration level (N⁻). On this occasion, the region right below the doping stopper 14, i.e., the region directly above the gate electrode 11 is kept in an intrinsic semiconductor layer to be a channel region (CH) of the TFT. It is possible to leave the resist that was used for etching the doping stopper 14 during ion doping, and remove it after ion doping.

Figure 8E:
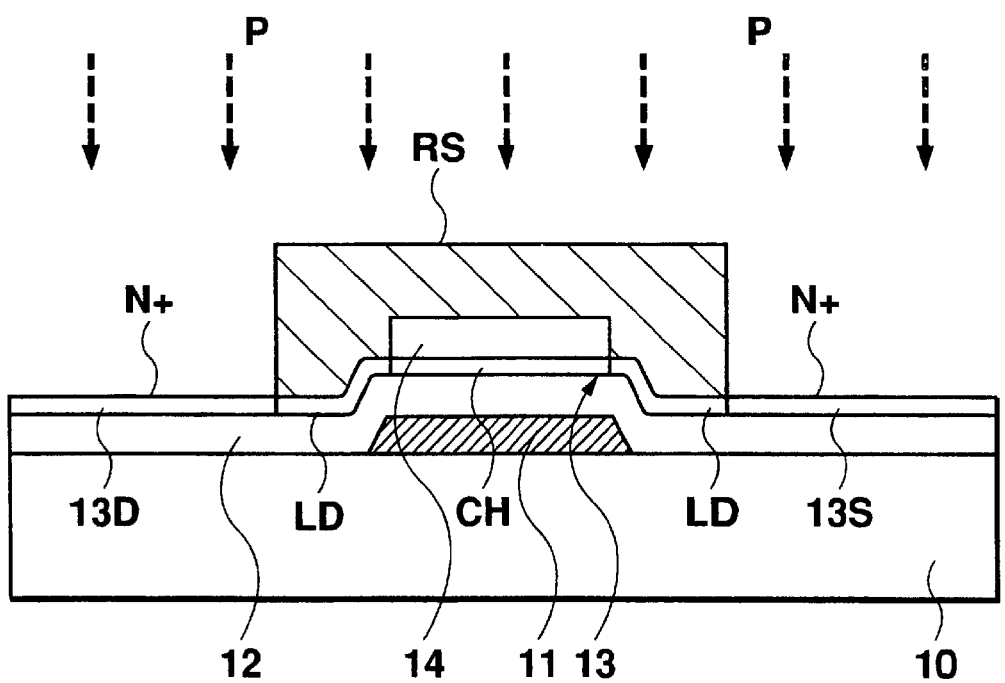

In the step shown in FIG. 8E, a resist RS larger than the gate electrode 11 at least in the channel length direction is formed and is used as a mask for ion doping of phosphor (P) into the p-Si film 13 at high dose extent of approximately $10^{15}$, that the region, except for the resist RS, is doped at high concentration level (N⁺). At this point, the low concentration region (N⁻) and the channel region (CH) are kept in the region right below the resist RS. Thus, the LDD structure is obtained in which source and drain regions 13S and 13D are disposed at both sides of the channel region CH via the low concentration LD region.

After removing the resist RS, the p-Si film doped with the impurity ion is processed by activation annealing such as heating or laser irradiation in order to recover the crystalline of the p-Si film and to substitute the impurity for the lattice.

Figure 8F:
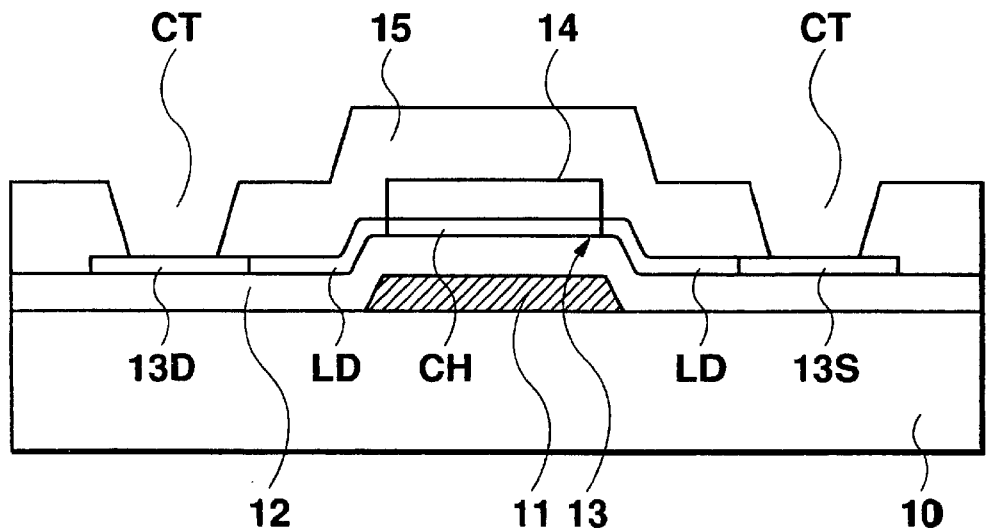

In the step shown in FIG. 8F, the p-Si film 13 is etched so as to form an island of necessary region for the TFT. Then, an interlayer insulating layer 15 is formed using $SiN_x$ and so on, in which the portions corresponding to the source and drain regions 13S and 13D are removed by etching so as to form contact holes CT, partially exposing the p-Si film 13.

Figure 8G:
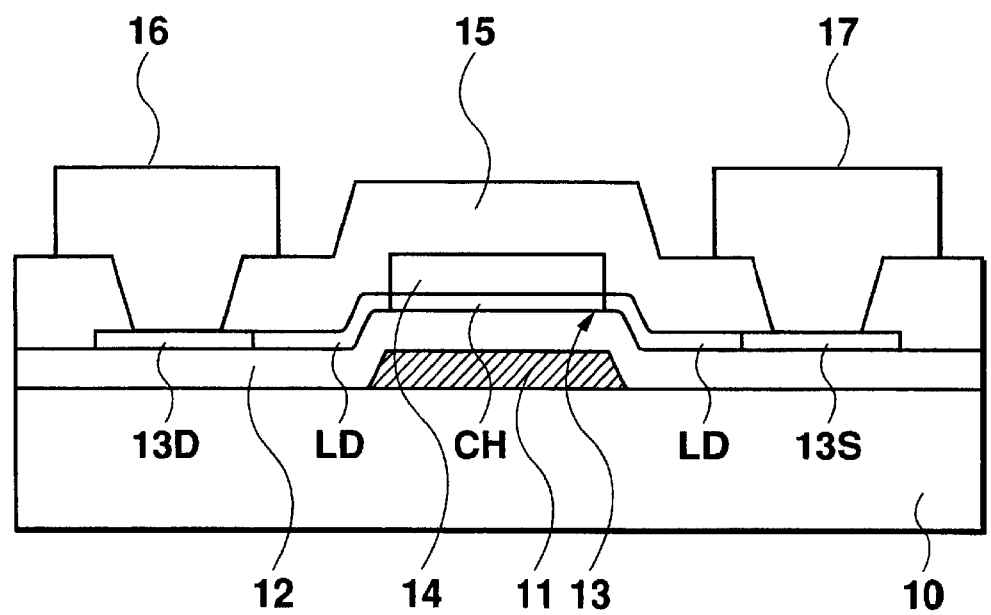

In the step shown in FIG. 8G, an Al/Mo film is formed by sputtering, which is etched to form a source electrode 17 connected to the source region 13S via the contact hole CT and a drain electrode 16 connected to the drain region 13D via the contact hole CT. Thus, the TFT is made completely.

Figure 8H:
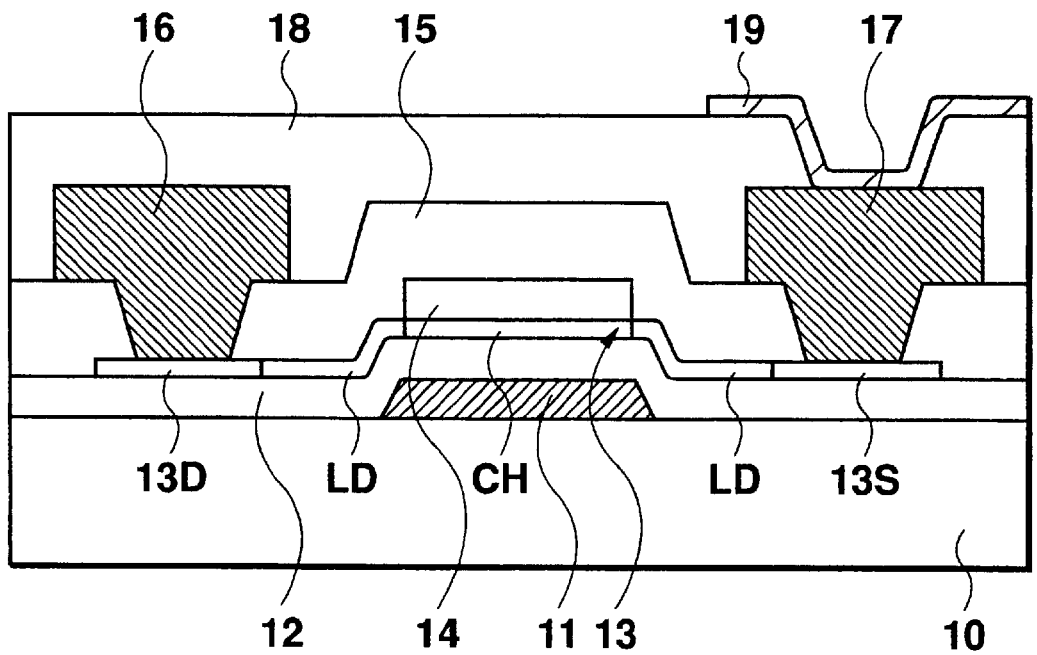

Furthermore, in the step shown in FIG. 8H, the planarization insulator film 18 made of photosensitive acrylic resin covering the TFT is formed. The planarization insulator film 18 is exposed and is developed so as to form contact holes in the display portions and to form naked upper portion of the source electrode 17. Then an ITO film is formed by sputtering, which is etched to form the pixel electrode 19 that is connected to the source electrode 17.

Figure 8I:
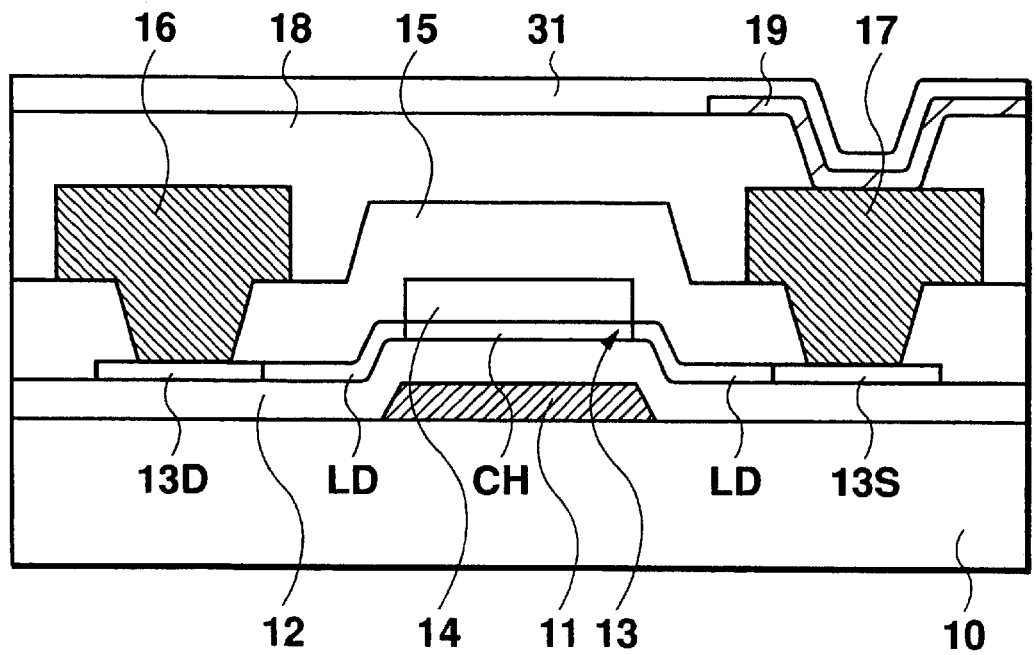

In the step shown in FIG. 8I, a liquid-like polyimide is coated by printing and is prebaked at 80° C. for 10 minutes, followed by main baking at 180° C. for 30 minutes and drying so as to form the vertical alignment film 31.

As mentioned above, the TFT substrate is manufactured.

Next, the method for manufacturing the opposing substrate will be explained with reference to FIGS. 9A–9D. First, in the step shown in FIG. 9A, red (R), green (G), and blue (B) color filters 21R, 21G, and 21B are formed on the substrate 20. In order to form the R color filter 21R, a photosensitive R film resist is affixed, which is then exposed and developed in the shape corresponding to the R display pixels. In the same way, the G color filter 21G and the B color filter 21B are formed, too.

Figure 9A:
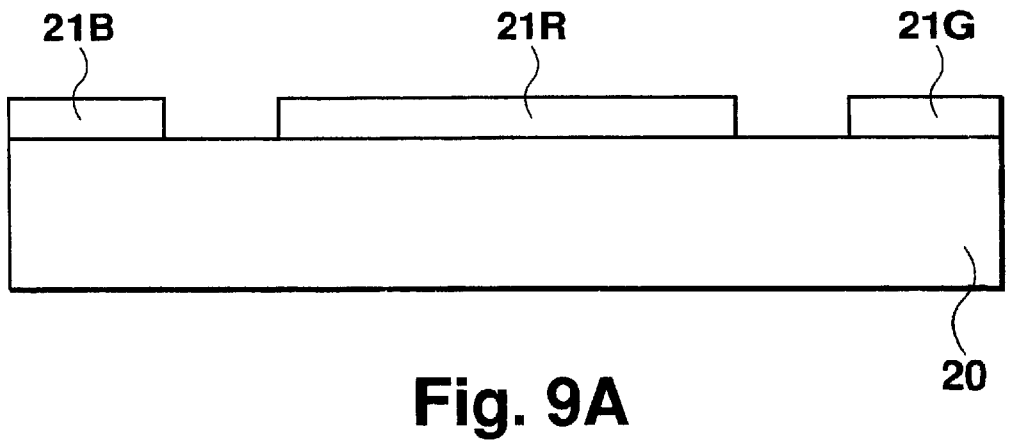
FIGS. 9A, 9B, 9C, 9D, 9E, and 9F are cross sections showing manufacturing steps of the liquid crystal display in accordance with the embodiment of the present invention.
Figure 9B:
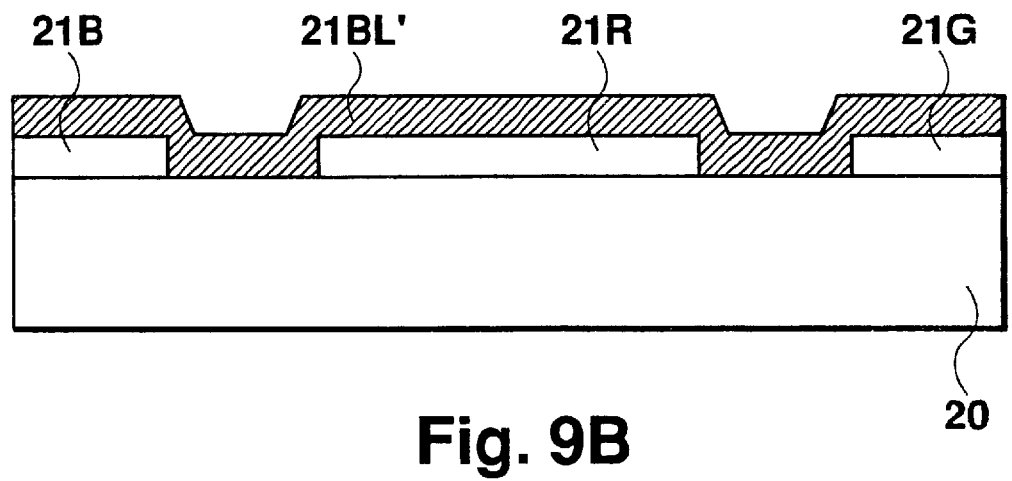

In the step shown in FIG. 9B, a non-transparent film resist 21BL' is affixed.

Figure 9C:
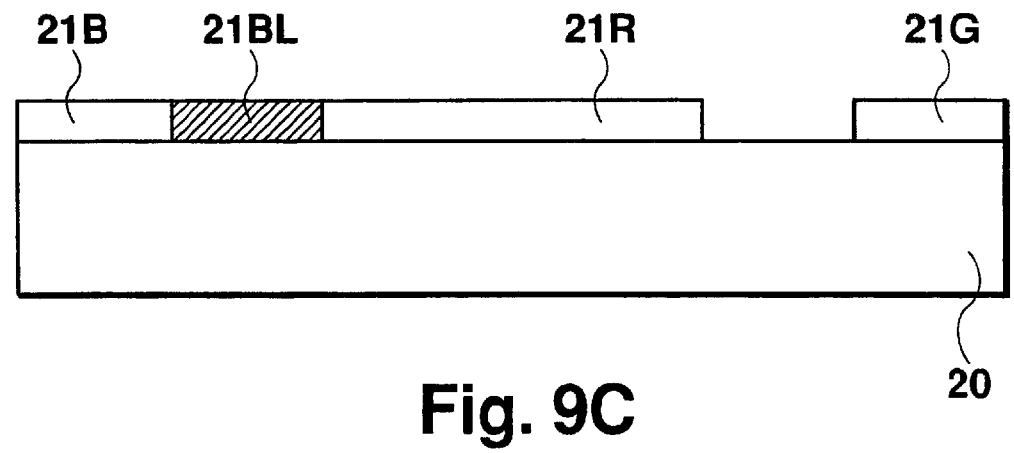

In the step shown in FIG. 9C, the film resist is exposed and developed only at the region opposing the TFT in the shape corresponding to the gap between the pixel electrodes, so as to form the light shielding film 21BL between the color filters 21R and 21B, for example.

Figure 9D:
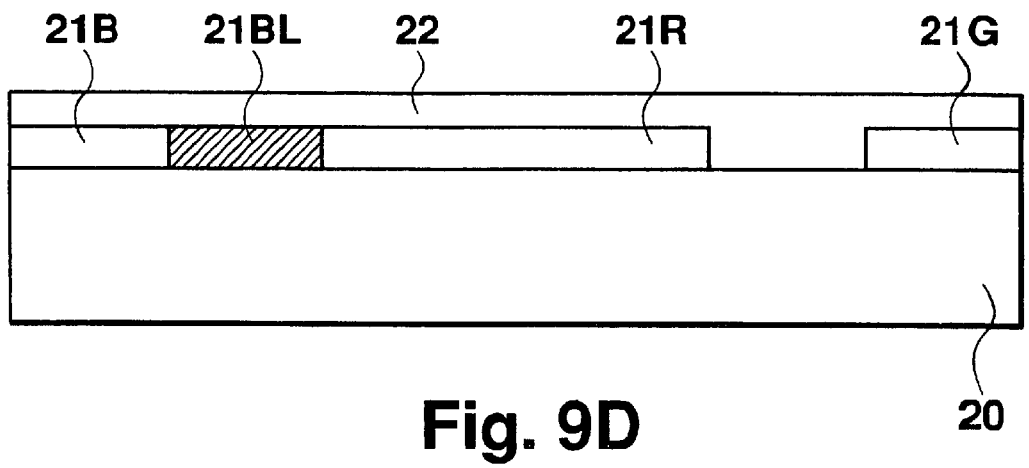

In the step shown in FIG. 9D, an acrylate resin film is formed so as to cover the color filters 21R, 21G, 21B, and the light shielding film 21BL. The acrylic resin film becomes a protection film 22 of the color filters 21R, 21G, and 21B, and also works as a planarization film for a foundation of the common electrode 23.

Figure 9E:
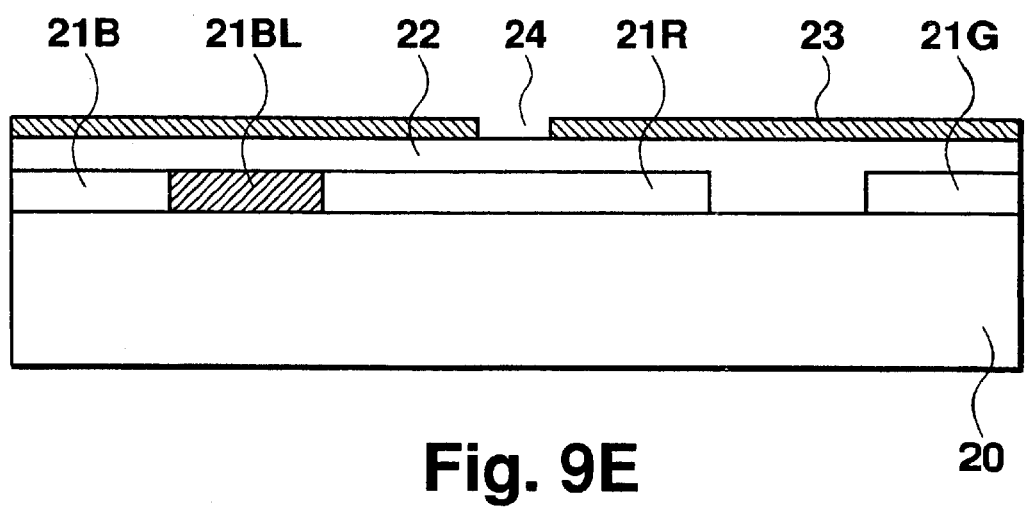

In the step shown in FIG. 9E, an ITO film is formed by sputtering, which is etched to form the common electrode 23 and the direction control window 24 that is electrode-free portion in the common electrode 23.

Figure 9F:
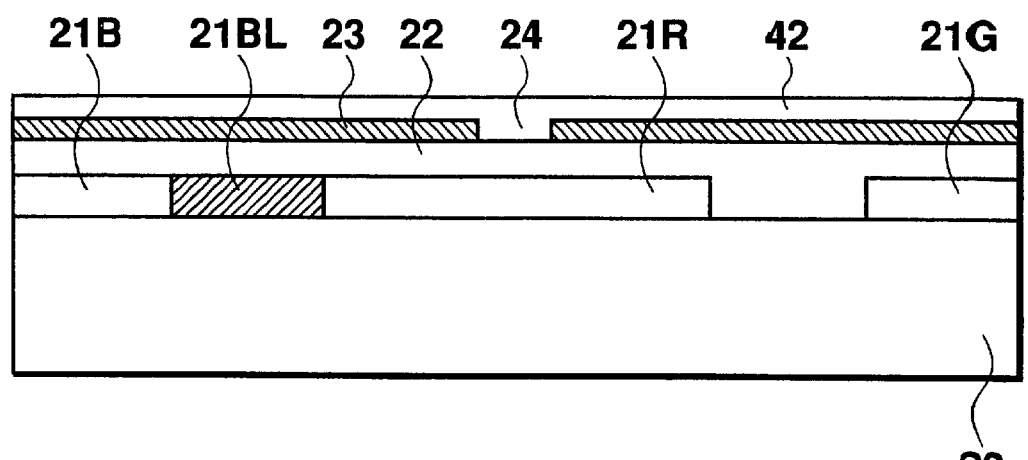

In the step shown in FIG. 9F, a liquid-like polyimide is coated by printing and is prebaked at 80° C. for 10 minutes, followed by main baking at 180° C. for 30 minutes and drying so as to form the vertical alignment film 32.

An opposing substrate can be manufactured as described above.

Figure 6A:
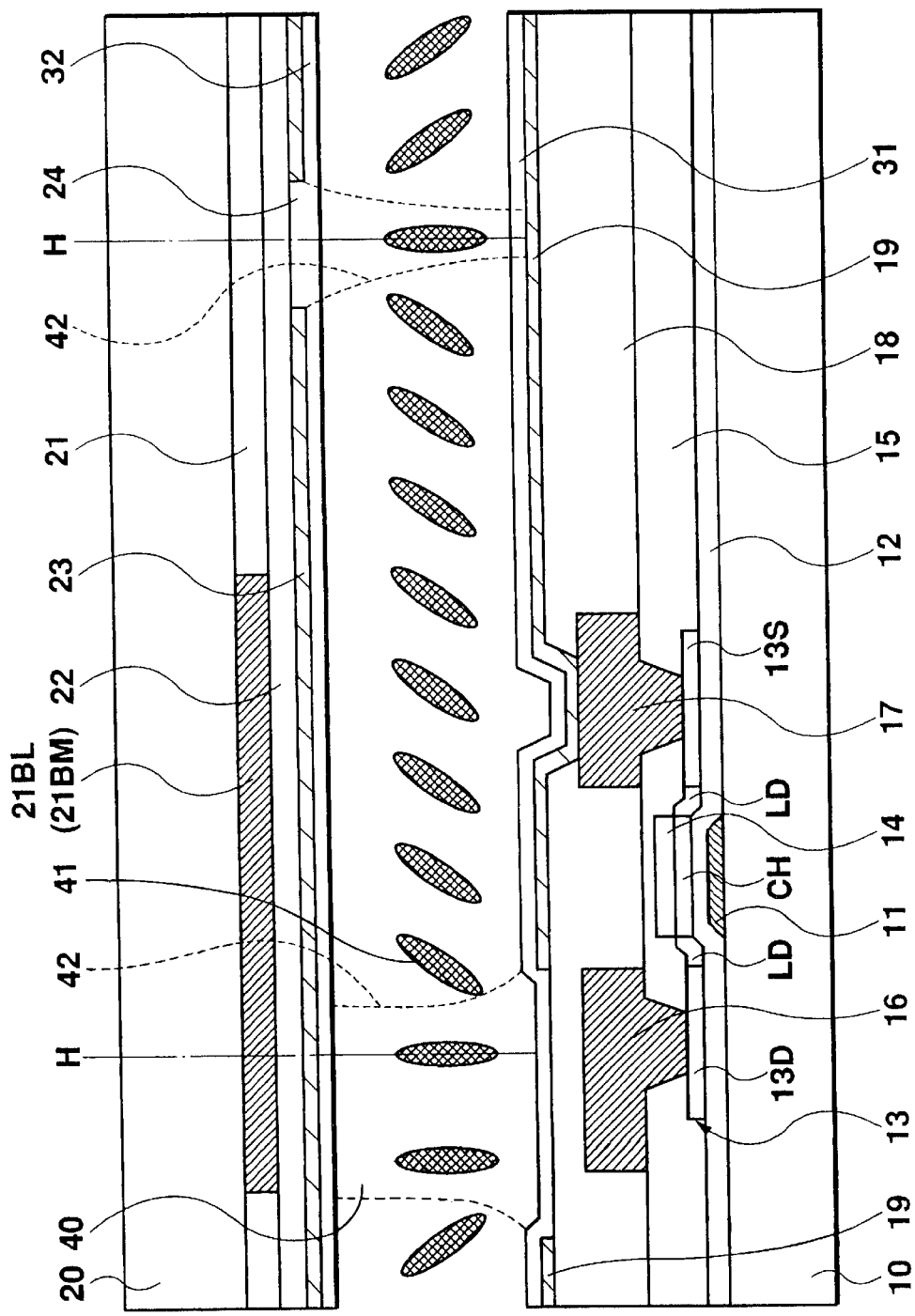

Next, a second embodiment of the present invention will be explained, though explanation of corresponding details will not be repeated. FIG. 10 is a plan view of the display picture portion. The cross section along the 6—6 line in FIG. 10 is shown in FIG. 6A. In this embodiment, the opposing substrate side is provided with a black matrix that covers the TFT region and covers a portion of the gap between the pixel electrodes. As explained above, though little light leaks through the gap between the pixels since the liquid crystal is not provided with a pretilt angle, some light can leak due to a diffraction of light inside the panel. Therefore, a black matrix 21BM is formed to cover not only the TFT but also the gap between the pixels. Thus, the gap between the pixels is completely shielding from light, and contrast is improved.

However, this black matrix 21BM is formed to be slightly smaller than the gap between the pixels so that a possible position shift in affixing will not cause the black matrix 21BM to overlap the pixel electrode 19.

FIGS. 11A–11F show a method for manufacturing the opposing substrate unit in accordance with the embodiment of the present invention. First, in the step shown in FIG. 11A, red (R), green (G), and blue (B) color filters 21R, 21G, and 21B are formed on the substrate 20 to be slightly larger than each corresponding pixel electrode 19.

Figure 11A:
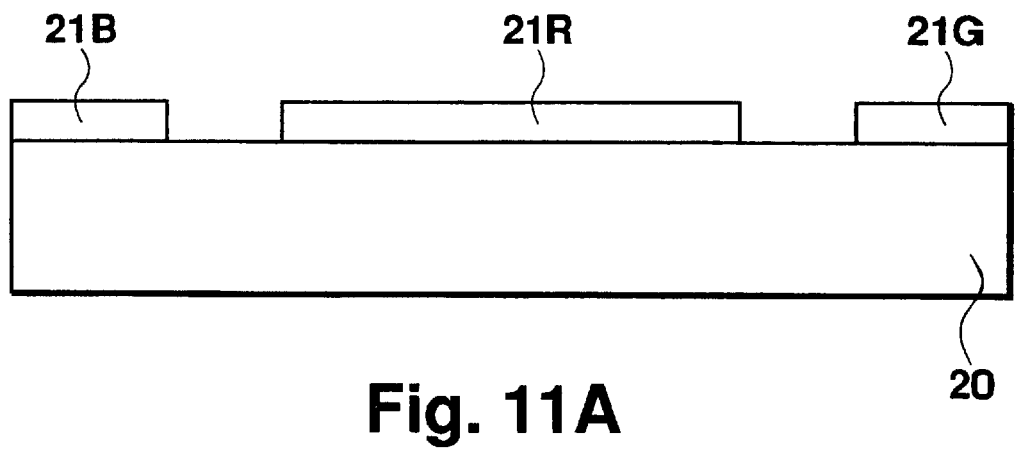
FIGS. 11A, 11B, 11C, 11D, 11E, and 11F are cross sections showing manufacturing steps of the liquid crystal display in accordance with the embodiment of the present invention.
Figure 11B:
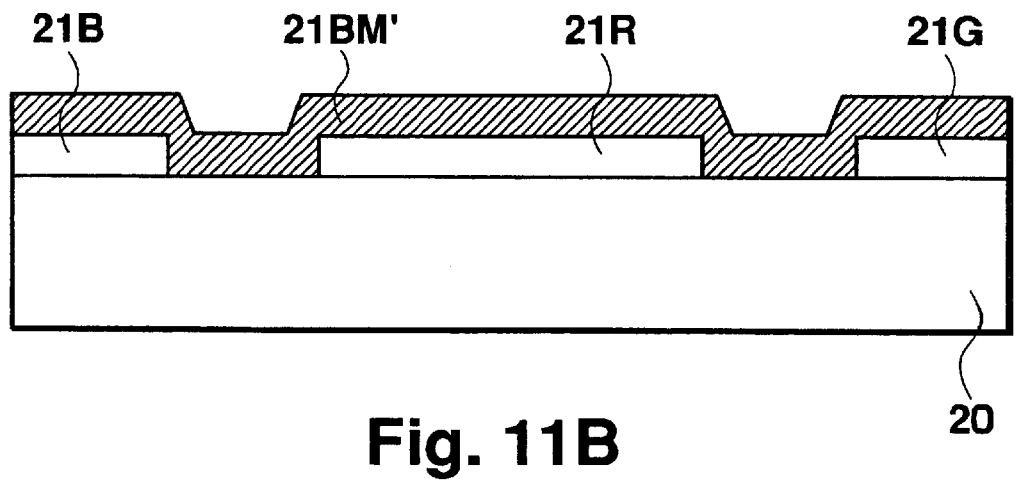

In the step shown in FIG. 11B, a non-transparent film resist 21BM' is affixed.

Figure 11C:
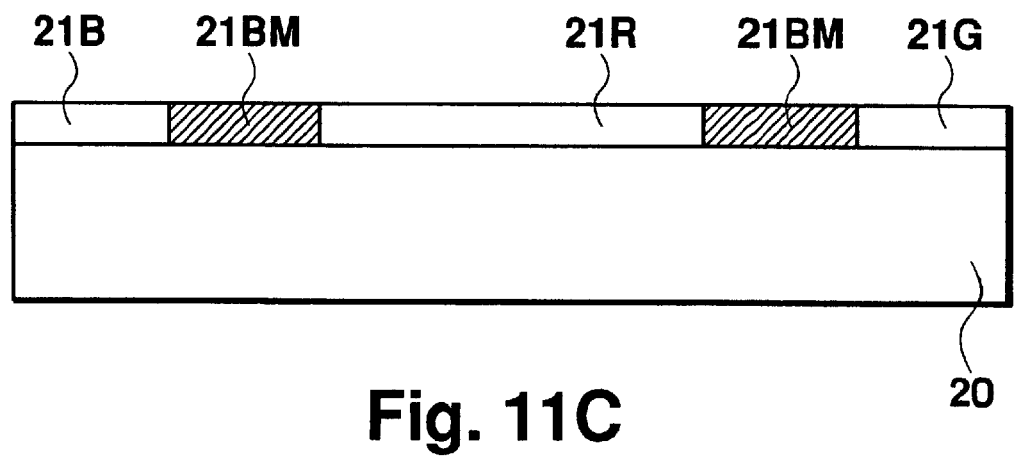

In the step shown in FIG. 11C, the film resist is exposed and developed in the shape corresponding to the TFT and the gap between the pixel electrodes, so as to form the black matrix 21BM between the color filters 21R and 21B, for example.

Figure 11D:
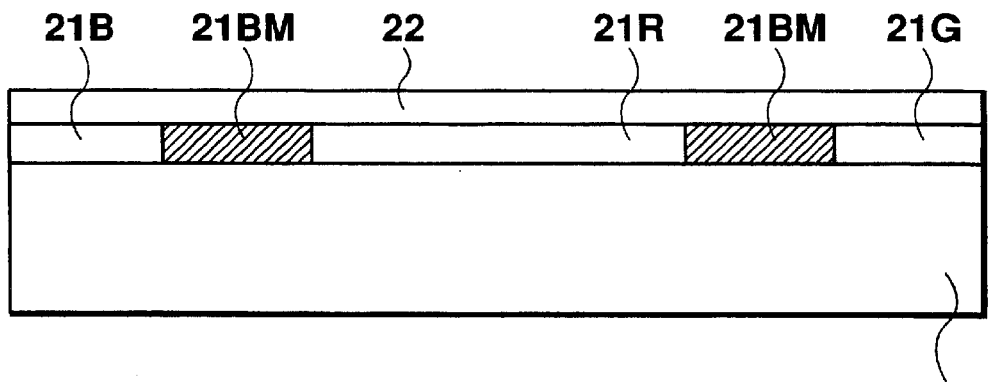

In the step shown in FIG. 11D, an acrylic resin film is formed so as to cover the color filters 21R, 21G and 21B and the black matrix 21BM. The acrylic resin film becomes a protection film 22 of the color filters 21R, 21G and 21B, which also works as a planarization film for a foundation of the common electrode 23.

Figure 11E:
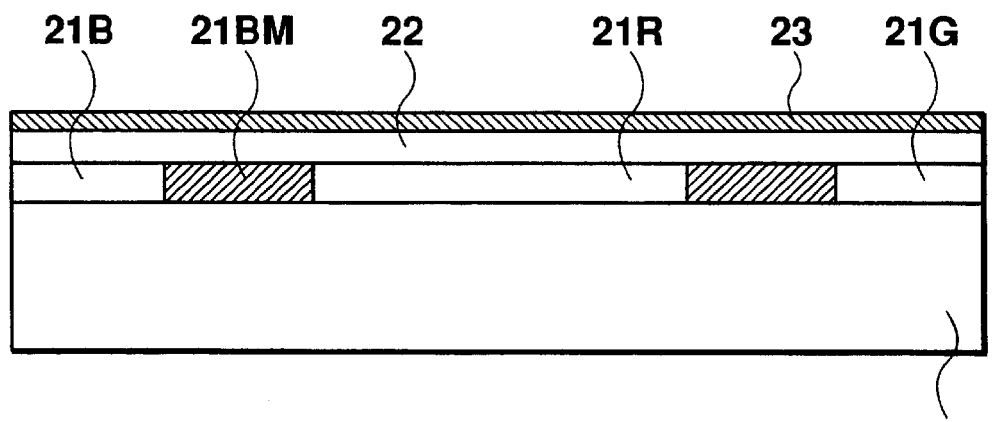

In the step shown in FIG. 11E, an ITO film is formed by sputtering, which is etched to form the common electrode 23 and the direction control window 24 that is electrode-free portion in the common electrode 23.

Figure 11F:
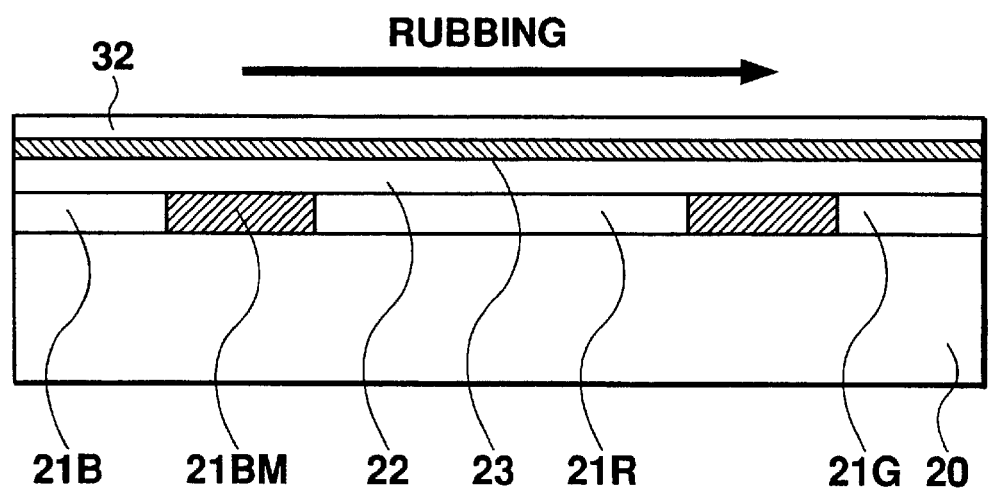

In the step shown in FIG. 11F, a liquid-like polyimide is coated by printing and is prebaked at 80° C. for 10 minutes, followed by main baking at 180° C. for 30 minutes and drying so as to form the vertical alignment film 32.

In the present invention, rubbing treatment is not performed in the step of forming the vertical alignment film 31 of the TFT substrate 10 as shown in FIG. 8I, or in the step of forming the alignment film 32 of the opposing substrate 20 as shown in FIGS. 9F and 11F. Therefore, the initial alignment of the liquid crystal does not include pretilt, and is within one degree from the normal direction. Particularly, since the rubbing treatment is not performed on the TFT substrate side, the TFTs are much less likely to break down and therefore, in LCDs with built-in drivers in which much more TFTs are concentrated in the driver portions 5 and 6 as compared to within the display portions, production yield is improved.

Furthermore, in the step of manufacturing the opposing substrate 20 as shown in FIGS. 8C and 11C, the black matrix 21BL and 21BM is formed only on the region corresponding to the TFTs and the narrow region between the pixels, not on the entire region between the pixels. Light is blocked between pixels by combination of the liquid crystal and the polarizing film and, as a result, loss of the effective display area due to the black matrix is reduced, and the aperture ratio is increased.

What is claimed is:

1. A liquid crystal display that has first and second substrates facing each other, the outer surface of the first and/or second substrate being provided with a polarizing film, and the liquid crystal disposed between the first and second substrates for modulating light that passed through the polarizing film so as to perform display, the liquid crystal display comprising:

a plurality of thin film transistors disposed in matrix on the surface of the first substrate facing the second substrate and electrode wires thereof;

an insulating film having a flattened surface and covering the thin film transistors and the electrode wires thereof;

a pixel electrode for driving the liquid crystal that is formed on the insulating film and is connected to the thin film transistor via an opening formed in the insulating film;

a vertical alignment film formed on the pixel electrodes;

a common electrode for driving the liquid crystal formed on the surface of the second substrate facing the first substrate;

a direction control window that is electrode-free portion formed in the area of the common electrode facing the pixel electrode;

a light shielding film having a portion formed over a gap region between adjacent pixel electrodes with a width that is smaller than the gap region between the pixel electrodes, wherein at least a portion of an edge of the pixel electrode is not light shielded, and light transmitted outside the pixel electrode in a vicinity of the edge contributes to the liquid crystal display; and a vertical alignment film formed on the common electrode, wherein the liquid crystal has negative dielectric constant anisotropy, and wherein the initial alignment of the liquid crystal is within one degree from the normal direction of the substrates.

2. The liquid crystal display in accordance with claim 1, wherein the surface of the second substrate facing the first substrate is provided with a color filter layer, and the common electrode is formed on the color filter layer.

3. The liquid crystal display in accordance with claim 1, wherein the color filter layer is covered by a protecting film and the common electrode is formed on the protecting layer.

4. The liquid crystal display in accordance with claim 1, wherein the vertical alignment film is not processed by rubbing treatment.

5. The liquid crystal display in accordance with claim 1, wherein the second substrate is transparent at least in the region corresponding to the pixel electrode and in the region corresponding to the gap between the pixel electrodes, and at least a part of the region corresponding to the gap between the pixel electrodes is shielded from light by the liquid crystal and the polarizing film.

6. The liquid crystal display in accordance with claim 1, wherein the insulating film has a thickness equal to or more than one micrometer.

7. A liquid crystal display that has first and second substrates facing each other, the outer surface of the first and/or second substrate being provided with a polarizing film, and the liquid crystal disposed between the first and second substrates for modulating light that passed through the polarizing film so as to perform display, the liquid crystal display comprising:

a plurality of thin film transistors disposed in matrix on the surface of the first substrate facing the second substrate and electrode wires thereof;

an insulating film having a flattened surface and covering the thin film transistors and the electrode wires thereof;

a pixel electrode for driving the liquid crystal that is formed on the insulating film and is connected to the thin film transistor via a opening formed in the insulating film, wherein at least a portion of an edge of the pixel electrode is not light shielded, and light transmitted outside the pixel electrode in a vicinity of the edge contributes to the liquid crystal display;

a vertical alignment film formed on the pixel electrodes;

a common electrode for driving the liquid crystal formed on the surface of the second substrate facing the first substrate;

a direction control window that is electrode-free portion formed in the area of the common electrode facing the pixel electrode;

a light shielding film formed in the region facing the thin film transistors and the region facing a gap region between the pixel electrodes, the light shielding film being smaller than the gap between the pixel electrodes in the region facing the gap region between the pixel electrodes; and a vertical alignment film formed on the common electrode, wherein the liquid crystal has negative dielectric constant anisotropy, and initial alignment of the liquid crystal is within one degree from the normal direction of the substrates.

8. A liquid crystal display having liquid crystal sealed between first and second substrates facing one another, comprising:

a plurality of pixel electrodes arranged in a matrix having rows and/or columns on said first substrate;

thin film transistors each connected to a respective one of said pixel electrodes;

a light shielding film disposed over and between the rows and/or columns of said pixel electrodes, said light shielding film having portions respectively with a width smaller than corresponding gaps between the rows or columns of said pixel electrodes at least in regions other than formation regions of corresponding thin film transistors, wherein at least a portion of an edge of the pixel electrode is not light shielded, and light transmitted outside the pixel electrode in a vicinity of the edge contributes to the liquid crystal display; and a common electrode formed on the second substrate, wherein said liquid crystal display is a normally black type which displays black when no voltage is applied between said pixel electrode and the common electrode.

9. The liquid crystal display in accordance with claim 8, further comprising:

a vertical alignment film formed over the pixel electrodes; wherein the liquid crystal is a vertical alignment type having negative dielectric constant anisotropy.

10. The liquid crystal display in accordance with claim 8, wherein a diagonal direction electric field and/or a region having no electric field is present within a pixel; and said diagonal direction electric field and/or a region having no electric field divides an alignment controlling direction of the liquid crystal.

11. The liquid crystal display in accordance with claim 10, wherein the common electrode includes a direction control window that is an electrode-free portion disposed in an area facing the pixel electrode; and said direction control window generates said diagonal direction electric field and/or a region having no electric field.

12. A liquid crystal display having liquid crystal sealed between first and second substrates facing one another, comprising:

a plurality of pixel electrodes arranged in a matrix having rows and/or columns on said first substrate;

a plurality of thin film transistors each connected to corresponding one of said pixel electrodes a light shielding film disposed over regions in which each said thin film transistor is formed and over regions between said pixel electrodes, said light shielding film having a portion in which the width of the light shielding film is smaller than the gap between adjacent pixel electrodes, wherein at least a portion of an edge of the pixel electrode is not light shielded, and light transmitted outside the pixel electrode in a vicinity of the edge contributes to the liquid crystal display; and a common electrode formed on the second substrate, wherein said liquid crystal display is a normally black type which displays black when no voltage is applied between said pixel electrode and the common electrode.

13. The liquid crystal display in accordance with claim 12, further comprising:

a vertical alignment film formed over the pixel electrodes; wherein the liquid crystal is a vertical alignment type having negative dielectric constant anisotropy.

14. The liquid crystal display in accordance with claim 12, wherein a diagonal direction electric field and/or a region having no electric field is present within a pixel; and said diagonal direction electric field and/or a region having no electric field divides an alignment controlling direction of the liquid crystal.

15. The liquid crystal display in accordance with claim 14, wherein the common electrode includes a direction control window that is an electrode-free portion disposed in an area facing the pixel electrode; and said direction control window generates said diagonal direction electric field and/or a region having no electric field.

* * * * *